(12) United States Patent
Tao et al.

(10) Patent No.: US 10,484,424 B2
(45) Date of Patent: Nov. 19, 2019

(54) METHOD AND SYSTEM FOR SECURITY PROTECTION OF ACCOUNT INFORMATION

(71) Applicant: Tencent Technology (Shenzhen) Company Limited, Shenzhen (CN)

(72) Inventors: Sinan Tao, Shenzhen (CN); Xuyang Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 305 days.

(21) Appl. No.: 15/182,638

(22) Filed: Jun. 15, 2016

(65) Prior Publication Data

US 2016/0294867 A1  Oct. 6, 2016

Related U.S. Application Data

(63) Continuation of application No. PCT/CN2015/072916, filed on Feb. 12, 2015.

(30) Foreign Application Priority Data

Feb. 14, 2014  (CN) .......................... 2014 1 0051774

(51) Int. Cl.
*H04L 29/06* (2006.01)
*G06F 21/55* (2013.01)

(52) U.S. Cl.
CPC .......... *H04L 63/1483* (2013.01); *G06F 21/55* (2013.01); *H04L 63/10* (2013.01); *H04L 63/1416* (2013.01)

(58) Field of Classification Search
CPC . H04L 63/1483; H04L 63/10; H04L 63/1416; G06F 21/55; G06F 17/30864; G06F 17/3053; G06F 17/30876

(Continued)

(56) References Cited

U.S. PATENT DOCUMENTS 8,079,087 B1 * 12/2011 Spies ...................... G06F 21/51
                                                                    726/26
8,205,255 B2 * 6/2012 Benea ...................... G06F 21/64
                                                                    713/194

(Continued)

FOREIGN PATENT DOCUMENTS

CN        101534306        9/2009
CN        102316081        1/2012

(Continued)

OTHER PUBLICATIONS

Maximizing online security by providing a 3 factor authentication system to counter-attack 'Phishing' IEEE Xplore | IEEE Conferences | Dec. 1, 2010 | INTERACT-2010 (pp. 388-392) (Year: 2010).*

(Continued)

*Primary Examiner* — Khang Do
*Assistant Examiner* — Feliciano S Mejia
(74) *Attorney, Agent, or Firm* — Brinks Gilson & Lione

(57) ABSTRACT

A method for security protection of account information is provided, where the method includes: detecting an account input event on an accessed web page; determining, when the account input event is detected, whether a URL of the accessed web page exists in a preset secure URL list; calculating, if the URL of the accessed web page does not exist in the secure URL list, a page similarity between the accessed web page and a preset real web page according to the URL and/or web page content of the accessed web page; and determining, according to the page similarity, whether the accessed web page has a security risk, and if yes, displaying an account security risk alert. The method preventing a user from being induced by a malicious website to input an account and a password. A system for security protection of account information is further provided.

10 Claims, 8 Drawing Sheets

(58) Field of Classification Search
USPC .................................................. 726/22, 25
See application file for complete search history.

(56) References Cited

U.S. PATENT DOCUMENTS

| | | | | |
|---|---|---|---|---|
| 8,291,065 | B2* | 10/2012 | Goodman | ........... H04L 63/1408 709/206 |
| 8,448,245 | B2* | 5/2013 | Banerjee | ................. G06F 21/51 709/224 |
| 9,124,623 | B1* | 9/2015 | Chen | .................... H04L 63/1416 |
| 2010/0083383 | A1 | 4/2010 | Adler et al. | |
| 2012/0192277 | A1* | 7/2012 | Jakobsson | ............... G06F 21/31 726/24 |

FOREIGN PATENT DOCUMENTS

| | | |
|---|---|---|
| CN | 103092832 | 5/2013 |
| CN | 103118026 | 5/2013 |
| CN | 103368958 | 10/2013 |
| CN | 103491543 | 1/2014 |
| CN | 103501306 | 1/2014 |
| WO | WO 2015/120808 | 8/2015 |

OTHER PUBLICATIONS

Phishing Detection: A Literature Survey IEEE Xplore | IEEE Periodicals | Apr. 12, 2013 | IEEE Communications Surveys & Tutorials https://ieeexplore.ieee.org/document/6497928?source=IQplus, pp. 2091-2021 (Year: 2013).*
Notification of Office Action and Search Report dated Apr. 5, 2017 From the State Intellectual Property Office of the People's Republic of China Re. Application No. 201410051774.7. (7 Pages).
Notification of Office Action and Search Report dated Jan. 10, 2017 From the State Intellectual Property Office of the People's Republic of China Re. Application No. 201410051774.7. (7 Pages).
International Search Report and the Written Opinion dated May 13, 2015 From the International Searching Authority Re. Application No. PCT/CN2015/072916.

* cited by examiner

METHOD AND SYSTEM FOR SECURITY PROTECTION OF ACCOUNT INFORMATION

RELATED APPLICATIONS

This application is a Continuation of PCT Patent Application No. PCT/CN2015/072916 having International filing date of Feb. 12, 2015, which claims the benefit of priority of Chinese Patent Application No. 201410051774.7 filed on Feb. 14, 2014. The contents of the above applications are incorporated by reference as if fully set forth herein.

FIELD AND BACKGROUND OF THE INVENTION

The present disclosure relates to the field of computer security technologies, and in particular, to a method and a system for security protection of account information.

Continuous development of an Internet technology brings huge convenience to people in life and work, while also brings a new potential security risk. Currently thereby are many phishing websites on the Internet, and these websites counterfeit URLs and page content of real websites, to cheat users of the real websites out of their trust, and induce the user to input sensitive information such as an account and a password, so as to achieve an unlawful purpose of stealing property of the user, or the like, thereby bringing a loss to the user. Moreover, if the sensitive information of the user is relevant to a social relationship chain of the user, such as an account and a password of a social network or social software, a law breaker even defrauds another user that has a social relationship with the user by using the sensitive information obtained from the phishing websites, which as a result causes a loss in a larger range, and results in a very extensive harm.

Currently, to prevent disclosure of the sensitive information, generally a database recording URLs of the phishing websites is established in advance. When the user accesses a web page, it is determined whether a URL of the web page that the user accesses is in the database, and if yes, the website where the web page resides is a phishing website; or if not, it is determined that the website where the web page resides is not a phishing website, and is secure.

However, a prevention capability of a conventional method for security protection of account information completely relies on a pre-established database, and if the URL of a phishing website is not in the database, this method does not work. Furthermore, currently existence duration of a phishing website is very short, and often after being propagated for several times, the phishing website immediately transforms and disguises the domain name and link form, and continues to be propagated and do evil after changing the URL into a URL that does not exist in the database. Therefore, it is already difficult for such a conventional method for security protection of account information to discriminate a phishing website.

SUMMARY OF THE INVENTION

Based on this, it is necessary to provide, for the foregoing problems, a method and a system for security protection of account information, which can effectively protect security of account information.

A method for security protection of account information includes:

detecting an account input event on an accessed web page;

determining, when the account input event is detected, whether a URL of the accessed web page exists in a preset secure URL list;

calculating, if the URL of the accessed web page does not exist in the secure URL list, a page similarity between the accessed web page and a preset real web page according to the URL and/or web page content of the accessed web page; and determining, according to the page similarity, whether the accessed web page has a security risk, and if yes, displaying an account security risk alert.

A system for security protection of account information includes:

an event detecting module, configured to detect an account input event on an accessed web page;

an existence judging module, configured to determine, when the account input event is detected, whether a URL of the accessed web page exists in a preset secure URL list;

a similarity calculating module, configured to calculate, if the URL of the accessed web page does not exist in the secure URL list, a page similarity between the accessed web page and a preset real web page according to the URL and/or web page content of the accessed web page; and an account security risk alert module, configured to determine, according to the page similarity, whether the accessed web page has a security risk, and if yes, display an account security risk alert.

The foregoing method and system for security protection of account information detect an account input event on an accessed web page first, and if the account input event is detected, determine whether a URL of the accessed web page exists in a preset secure URL list. If the URL of the accessed web page is not in the preset secure URL list, it indicates that the accessed web page may be a malicious website, and in this case it needs to further calculate a page similarity between the accessed web page and a preset real web page according to the URL and/or web page content of the accessed web page. The page similarity can measure a similarity between the accessed web page and the preset real web page. A higher page similarity indicates a higher similarity between the accessed web page and the preset real web page, and a higher security risk. Therefore, it may be determined, according to the page similarity, whether the accessed web page has a security risk, and if the accessed web page has the security risk, a security risk alert is displayed, thereby preventing a user from being induced by a malicious website to input an account and a password, and achieving a purpose of security protection of user account information.

BRIEF DESCRIPTION OF THE SEVERAL VIEWS OF THE DRAWINGS

In order to illustrate technical solutions according to embodiments of the present disclosure, the drawings to be used in the descriptions of the embodiments of the disclosure will be described briefly hereinafter. The drawings described hereinafter include only some embodiments related to the present disclosure. Other drawings may be determined by those skilled in the art based on those drawings without any creative effort.

DESCRIPTION OF SPECIFIC EMBODIMENTS OF THE INVENTION

To make a purpose, a technical solution, and an advantage of the present disclosure clearer, the following further describes the present disclosure in detail with reference to accompanying drawings and embodiments. It should be understood that, the specific embodiments described herein are only used to explain the present disclosure, but are not used to limit the present disclosure.

Unless the context clearly indicates otherwise, singular elements or components in the present disclosure may be in the plural and vice versa, which is not limited in the present disclosure. Although steps in the present disclosure are labeled with numbers, such numbers are not intended to limit the order of these steps. Unless the order of steps is explicitly stated or it is explicitly stated that a step needs to be performed on the basis of another step, the relative order of steps can be adjusted. It should be understood that as used herein, the term "and/or" involves and includes any and all combinations of one or more of the associated listed items.

Figure 1:
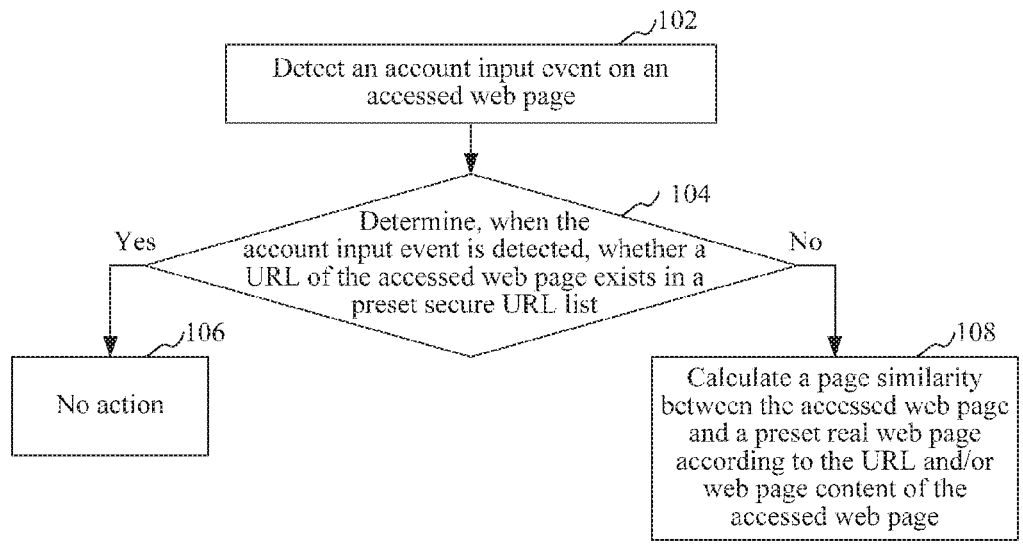
FIG. 1 is a schematic flowchart of a method for security protection of account information in an embodiment.

As shown in FIG. 1, in an embodiment, a method for security protection of account information is provided. This embodiment is mainly described by using an example in which the method is applied to a terminal having a network connection function. The method includes:

Step 102: Detect an account input event on an accessed web page.

The accessed web page refers to a web page that currently a user is accessing. The account input event may be detected by checking content inputted in a password input box. Generally, an account has a specific format, for example, is a character string whose length exceeds a preset length value, consists of digits or letters, and generally does not include Chinese characters. Therefore, the account input event may be detected by checking whether a character string in a preset format is inputted in the input box on the accessed web page.

Step 104: Determine, when the account input event is detected, whether a URL of the accessed web page exists in a preset secure URL list, and if yes, perform step 106; or if not, perform step 108.

When the account input event is detected, it indicates that the user performs a login operation, and whether the accessed web page is secure needs to be determined. The preset secure URL list includes URLs of websites or web pages that are determined to be trusty, for example, an official website of a well-known company, and a web page thereof. The preset secure URL list may be obtained from a server and locally stored; or may be stored in a server, and pulled from the server when needed. The secure URL list does not necessarily need to be in the form of a table, but may also be text or be data stored in a predetermined format in a database. The URL of the accessed web page and the URLs in the preset secure URL list may be domain name addresses, or may be Internet Protocol (IP) addresses.

Step 106: No action.

In this case, the URL of the accessed web page exists in the preset secure URL list, which indicates that the accessed web page is secure, and there is no security risk for the user to log in to the web page.

Step 108: Calculate a page similarity between the accessed web page and a preset real web page according to the URL and/or web page content of the accessed web page.

In this case, the URL of the accessed web page is not in the preset secure URL list, which indicates that security of the accessed web page is unknown, and it needs to measure the security of the accessed web page according to a similarity between the accessed web page and the preset real web page, where the preset real web page refers to a web page subject to counterfeiting. A higher similarity indicates a higher probability that the accessed web page is a malicious web page that counterfeits the preset real web page, and therefore indicates a lower security.

A URL and web page content of the preset real web page are objects subject to counterfeiting. Therefore, the page similarity between the accessed web page and the preset real web page may be calculated according to the URL and/or the web page content of the accessed web page, and furthermore the similarity between the accessed web page and the preset real web page may be measured. The page similarity between the accessed web page and the preset real web page may be calculated by detecting whether the character string in the URL and/or the web page content of the accessed web page includes a preset keyword, and according to a frequency of occurrence of the preset keyword. The web page content of the accessed web page may be obtained by using a document object model (DOM, where the DOM can access and modify content and a structure of a document in a platform- and language-independent manner) tree.

In an embodiment, the web page similarity may be calculated according to an edit distance between the character string in the URL and/or the web page content of the accessed web page and the character string in the corresponding URL and/or the web page content of the preset real web page. The edit distance refers to the minimum number of edit operations that are needed for converting one of two character strings into the other. Permitted edit operations include replacing one character with another character, inserting one character, and deleting one character.

For example, if the URL of the preset real web page includes a character string "abcdefg", a URL of a first accessed web page includes a character string "abcdefj", and a URL of a second accessed web page includes a character string "abgfedc", it is obvious that converting "abgfedc" into "abcdefg" needs more edit operations than converting "abcdefj" into "abcdefg" does, that is, the edit distance of the former is greater than that of the latter; therefore, "abcdefj" is more similar to "abcdefg" than "abgfedc" is, and the first accessed web page is more likely a malicious web page.

In an embodiment, the web page content of the accessed web page includes at least one of a web page title, text information before the input box, and web page copyright information.

For example, the web page title (title) is "XX company home page", "XX login page", or the like; the text before the input box is "account", "password", or the like; and the web page copyright information is "Copyright© 19xx-20xx, xxxx, All Rights Reserved", or the like. The web page content such as the web page title, the text information before the input box, and the web page copyright information is representative, and can reflect whether an owner of the accessed web page has an attempt to counterfeit a real web page. Therefore, it may be unnecessary to use all of the web page content of the accessed web page to calculate the page similarity, which can reduce calculation complexity.

Step 110: Determine, according to the page similarity, whether the accessed web page has a security risk, and if yes, perform step 112; or if not, perform step 114.

Specifically, when the page similarity exceeds a similarity threshold, it may be determined that the accessed web page has the security risk. In this case, the accessed web page is very similar to the preset real web page, and is very likely a web page formed by counterfeiting the real web page by a law breaker; and it may be determined that the accessed web page has the security risk. Different operations may be performed according to results of determining whether the accessed web page has a security risk.

Step 112: Display an account security risk alert.

In this case, the accessed web page has the security risk, and by displaying the account security risk alert, the user may be warned that the accessed web page is untrustworthy, which makes the user cautiously perform an operation of inputting the account and password to log in. In addition, a guidance tip of guiding the user to perform a secure login operation may be further displayed, thereby improving security of accessing a web page.

Step 114: No action.

If the accessed web page does not have the security risk, no processing needs to be performed, and the user is not affected due to the application of the method for security protection of account information, thereby improving operation convenience.

The foregoing method for security protection of account information detects an account input event on an accessed web page first, and if the account input event is detected, determines whether a URL of the accessed web page exists in a preset secure URL list. If the URL of the accessed web page is not in the preset secure URL list, it indicates that the accessed web page may be a malicious website, and in this case it needs to further calculate a page similarity between the accessed web page and a preset real web page according to the URL and/or web page content of the accessed web page. The page similarity can measure a similarity between the accessed web page and the preset real web page. A higher page similarity indicates a higher similarity between the accessed web page and the preset real web page, and a higher security risk. Therefore, whether the accessed web page has a security risk may be determined according to the page similarity, and if the accessed web page has the security risk, a security risk alert is displayed, thereby preventing a user from being induced by a malicious website to input an account and a password, and achieving a purpose of security protection of user account information.

Figure 2:
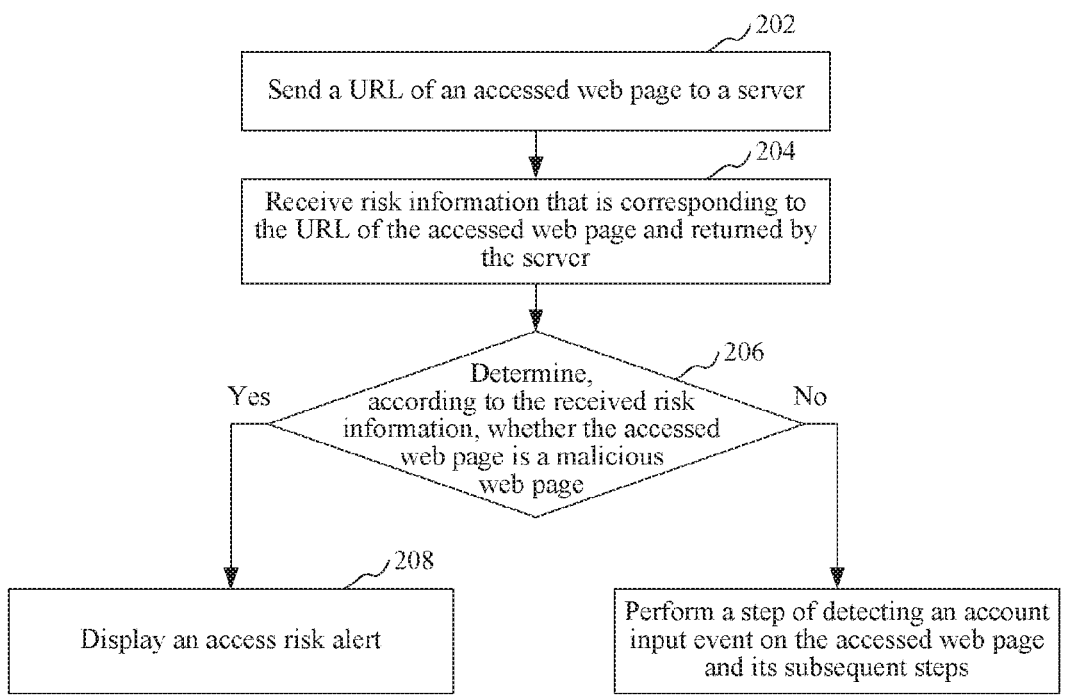
FIG. 2 is a schematic flowchart of a step of detecting a security risk for an accessed web page by using a server in an embodiment.

As shown in FIG. 2, in an embodiment, before step 102, the method further includes a step of detecting a security risk for the accessed web page by using a server, including:

Step 202: Send a URL of an accessed web page to a server.

Specifically, a terminal obtains an accessed URL in a web page browser, where the URL is the URL of the accessed web page, and sends the obtained URL to the server. The server herein may be a computer or a computer cluster.

Step 204: Receive risk information that is corresponding to the URL of the accessed web page and returned by the server.

After receiving the URL of the accessed web page sent by the terminal, the server returns the risk information corresponding to the URL.

Specifically, in an embodiment, step 204 includes: receiving, after the server finds risk information that is corresponding to the URL of the accessed web page and in a preset URL database, the risk information returned by the server.

In this embodiment, the server presets a URL database, where the URL database includes a large number of URLs of known malicious web pages, and a correspondence between the URL and risk information is recorded in the URL database. The risk information indicates whether a web page corresponding to a URL is a malicious web page, for example, the risk information may be "secure" or "risky". In addition, the risk information may have levels, for example, the risk information "risky" may have multiple levels such as "malicious", "high risk", and "low risk", and the different levels indicate different risk degrees.

The server may establish and maintain the URL database by means of machine learning. Specifically, the server may discover and download web page content by using a web crawler tool. Threatening web page content may be captured by using the web crawler tool with preset different themes and in a preset scoring manner. The server may simulate the browser, and detect a feature code that the web page content has, so as to extract page information needed for discrimination of the security risk. For the extracted page information, the server scans and distinguishes the web page content by means of word segmentation, a Bayes classifier, a similarity, keyword detection, and the like, to obtain the risk information, and finally can obtain the correspondence between URL and the risk information, and add the correspondence to the URL database.

Further, when finding the URL of the accessed web page from the URL database, the server obtains the risk information that is corresponding to the URL of the accessed web page and in the preset URL database, and returns the risk information to a terminal that sends the URL.

In this embodiment, the server presets the URL database, and the server can update the URL database in real time, to keep malicious URLs included in the URL database as comprehensive as possible; in this way, when the terminal searches the server for the risk information of the URL of the accessed web page, the server can return the risk information corresponding to the URL in time, thereby improving the processing efficiency.

In an embodiment, step 204 includes: receiving, when the server does not find risk information that is corresponding to the URL of the accessed web page and in a preset URL database, risk information that is generated according to the web page content of the accessed web page and then returned by the server.

Specifically, when the server does not find the risk information that is corresponding to the URL of the accessed web page and in the preset URL database, the server may obtain the web page content of the accessed web page, perform word segmentation on the obtained web page content, determine maliciousness of the accessed web page in at least one manner of the Bayes classifier, the similarity, and the keyword detection, generate the risk information according to the maliciousness, and return the generated risk information to the terminal.

In this embodiment, after receiving the URL of the accessed web page sent by the terminal, if the server does not find, in the preset URL database, the risk information corresponding to the URL of the accessed web page, in this case, the server may generate the risk information according to the web page content of the accessed web page, and return the risk information to the terminal that sends the URL. In addition, the server may correspondingly store the URL of the accessed web page and the risk information in the URL database, so that other users can quickly obtain the risk information during a search, and accordingly determine the security risk for the accessed web page in time.

Step 206: Determine, according to the received risk information, whether the accessed web page is a malicious web page, and if yes, perform step 208; or if not, perform step 102.

Whether the accessed web page is a malicious web page may be determined according to the risk information, and thereby different operations are performed according to different determining results. When the accessed web page is a non-malicious web page, to prevent detection of a malicious web page from being missed, step 102 and its subsequent steps in the foregoing embodiment may be performed.

Step 208: Display an access risk alert.

In this case, it may be determined according to the received risk information that the accessed web page is a malicious web page, the accessed web page may be intercepted, and the access risk alert may be displayed. The access risk alert indicates a risk for accessing the accessed web page.

In an embodiment, step 208 includes: stopping accessing the accessed web page, and displaying the access risk alert. In this embodiment, when it is determined that the accessed web page is a malicious web page, access to the accessed web page may be directly stopped, and the access risk alert may be displayed, to actively prevent the user from further performing a login operation. When receiving an instruction for continuing the access, the user may continue to access the accessed web page.

In an embodiment, the received risk information has levels; and step 208 includes: displaying an access risk alert corresponding to a level of the risk information. In this embodiment, the risk information received by the terminal has levels such as "malicious", "high risk", "low risk", and "secure". The different levels of the risk information indicate risks of different degrees. Therefore, displaying an access risk alert corresponding to the level of the risk information may show the user a risk degree of the accessed web page, so that the user performs an appropriate and secure operation according to the risk degree, thereby improving security of accessing a web page.

In this embodiment, in step 202 to step 208, risk information of an accessed web page is obtained from a server, and thereby whether the accessed web page is a malicious web page is determined according to the received risk information. When it is determined that the accessed web page is a malicious web page, an access risk alert is directly displayed, to prevent a user from further accessing the accessed web page, which can protect security of user account information to a certain extent. When it is determined that the accessed web page is a non-malicious web page, in this case the accessed web page may be secure, and may also be a malicious web page that the server misses detecting and does not find. In this case, the foregoing step of detecting an account input event on an accessed web page and its subsequent steps may be further performed, to prevent detection of a malicious web page from being missed.

Figure 3:
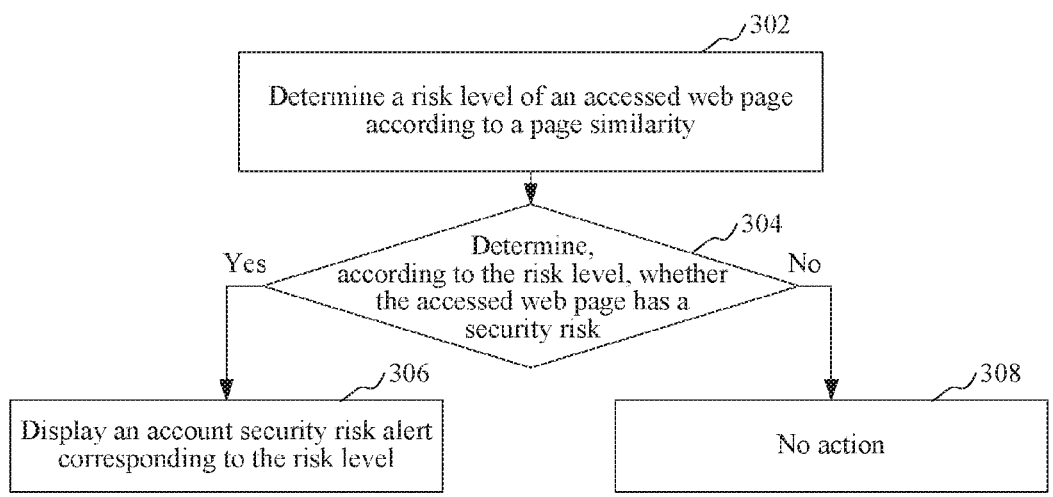
FIG. 3 is a schematic flowchart of a step of determining, according to a page similarity, whether an accessed web page has a security risk, and performing different operations according to determining results in an embodiment.

As shown in FIG. 3, in an embodiment, step 110 includes:

Step 302: Determine a risk level of the accessed web page according to the page similarity.

Specifically, page similarity value ranges corresponding to different risk levels may be preset, so that a risk level of the accessed web page may be determined according to a similarity value range that the page similarity obtained through calculation is in.

Step 304: Determine, according to the risk level, whether the accessed web page has a security risk, and if yes, perform step 306; or if not, perform step 308.

Specifically, the risk levels may include four levels, which are "malicious", "high risk", "low risk", and "secure", where the levels "malicious", "high risk", and "low risk" indicate that the accessed web page has the security risk, while the level "secure" indicates that the accessed web page does not have the security risk. Different operations are separately performed according to results of determining whether the accessed web page has a security risk.

Step 306: Display an account security risk alert corresponding to the risk level.

The risk level indicates whether the accessed web page has a security risk, and a degree of the security risk, and the account security risk alert indicates whether a user account has a security risk, and a degree of the security risk. Displaying the account security risk alert corresponding to the risk level can intuitively show the user the risk degree of the accessed web page, so that the user performs an appropriate and secure operation according to the risk degree of the accessed web page, thereby improving security of accessing a web page.

Step 308: No action.

When it is determined that the accessed web page does not have the security risk, in this case no processing needs to be performed, and the user is not affected due to the application of the method for security protection of account information, thereby improving operation convenience.

In this embodiment, in step 302 to step 308, a risk level of an accessed web page is determined according to a page similarity between the accessed web page and a preset real web page, and thereby account security risk alerts corresponding to different risk levels are displayed, and a risk degree of the accessed web page can be intuitively shown to a user, so that the user performs an appropriate and secure operation according to the risk degree of the accessed web page, thereby improving security of accessing a web page.

In an embodiment, the method for security protection of account information further includes step 11) and step 12):

Step 11): Detect a password submission event on an accessed web page.

Submission of a password is a necessary process for login, and whether there is a login operation may be detected by detecting the password submission event. Specifically, the password submission event may be detected by detecting submission of a form that includes a password. Whether the form includes the password may be determined by detecting whether a password identifier (for example, "password") exists in the form, so as to detect the password submission event on the accessed web page.

Step 12): Display a login security risk alert when the password submission event is detected, and when it is determined according to a page similarity that the accessed web page has a security risk.

When the password submission event is detected, and when it is determined according to the page similarity that the accessed web page has the security risk, a password submission operation is intercepted, the login security risk alert is displayed to a user, to give the user a final warning before the user performs a final login operation, thereby preventing account information disclosure.

In this embodiment, in step 11) to step 12), after a password is submitted, account information disclosure cannot be controlled, and therefore detecting a password submission event is the last guarantee for preventing the password disclosure. When the password submission event is detected, and it is determined according to a page similarity that an accessed web page has a security risk, a login security risk alert is displayed to a user, and before the user performs a final login operation, the user is given a final warning, thereby preventing account information disclosure, so as to guarantee the security of user account information.

In an embodiment, a step of displaying a login security risk alert when a password submission event is detected, and when it is determined according to a page similarity that an accessed web page has a security risk includes: when the password submission event is detected, and when a risk level of the accessed web page determined according to the page similarity indicates that the accessed web page has the security risk, a login security risk alert corresponding to the risk level is displayed.

In this embodiment, a risk level of an accessed web page may be determined according to a page similarity, and thereby when a login security risk alert is displayed, the login security risk alert corresponding to the risk level is displayed. The risk level may indicate whether the accessed web page has a security risk, and a degree of the security risk, and the account security risk alert may indicate whether a user account has a security risk, and a degree of the security risk. Displaying the account security risk alert corresponding to the risk level can intuitively show the user the risk degree of the accessed web page, so that the user performs an appropriate and secure operation according to the risk degree of the accessed web page, thereby improving security of accessing a web page.

In an embodiment, the method for security protection of account information further includes: correspondingly uploading a URL of an accessed web page having a security risk, and security risk information to a server.

The security risk information includes information about whether the accessed web page has the security risk, which is determined according to a page similarity, and preferably may include information about a risk level of the accessed web page determined according to the page similarity.

In this embodiment, a terminal correspondingly uploads a URL of an accessed web page having a security risk, and security risk information to a server, so that the server stores a correspondence between the URL of the accessed web page and the security risk information, and specifically the server may store the correspondence in a preset URL database. When accessing the accessed web page, another terminal may directly obtain the security risk information from the server, which implements sharing of the security risk information, and thereby may guarantee security of account information of a large number of users.

Figure 4:
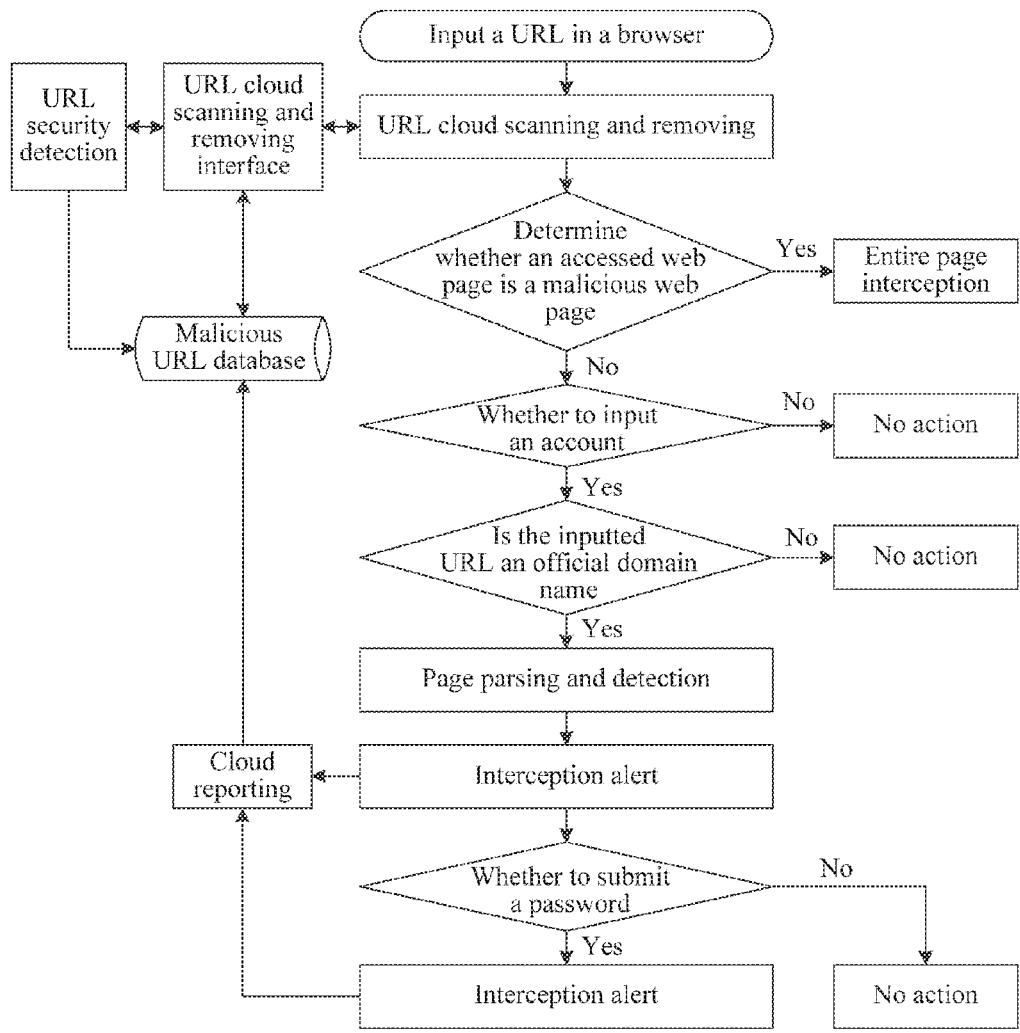
FIG. 4 is a schematic flowchart of applying a method for security protection of account information in a specific application scenario.
Figure 5:
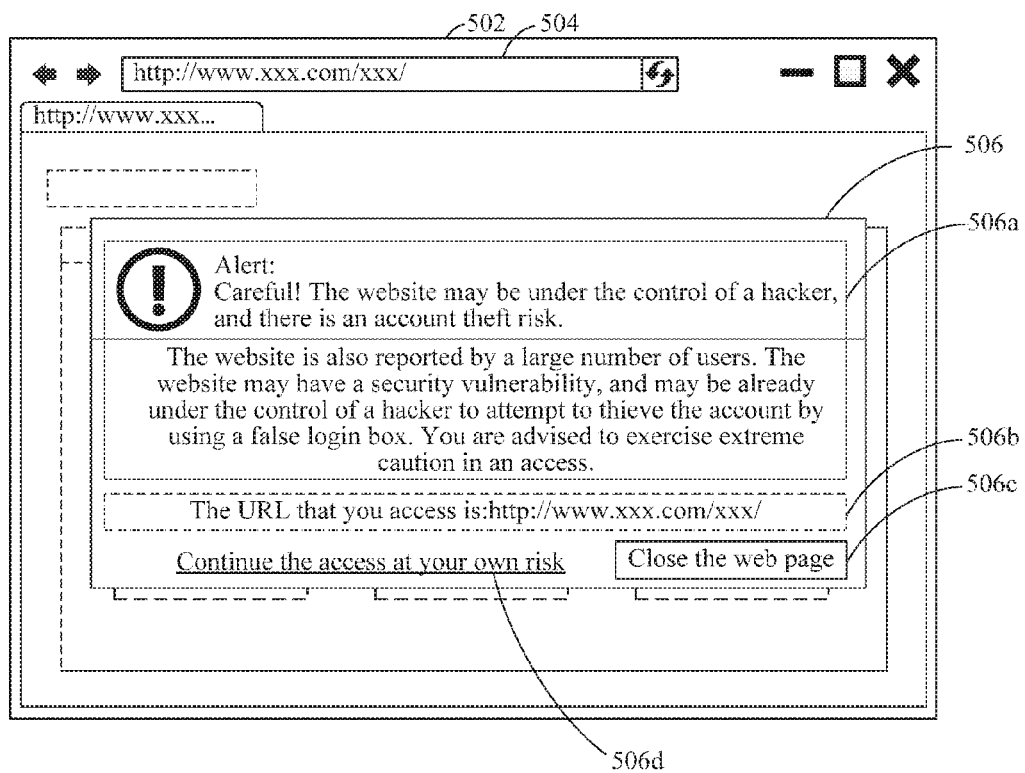
FIG. 5 is a schematic diagram of displaying an access risk alert in a specific application scenario.

The following describes a principle of the foregoing method for security protection of account information by using a specific application scenario. The application scenario is described by using an example in which the method for security protection of account information is applied to a terminal on which a browser is installed. Referring to FIG. 4, the method specifically includes the following steps:

21) As shown in FIG. 5, a user inputs a URL in an address box 504 of a browser 502, and trigger access to a web page, and in this case a terminal sends the accessed URL to a server to perform URL cloud scanning and removing by using a URL cloud scanning and removing interface, and the server searches a preset malicious URL database for risk information corresponding to the URL, and after finding the risk information, and returns the found risk information to the terminal by using the URL cloud scanning and removing interface. If the risk information is not found, the server performs URL security detection, and specifically generates risk information according to web page content of the URL, stores a correspondence between the URL and the risk information in the malicious URL database, and returns the generated risk information to the terminal.

22) The terminal determines according to the received risk information whether the accessed web page is a malicious web page, and if the accessed web page is not a malicious web page, does not alert the user, and continues to access the web page; and if the accessed web page is a malicious web page, stops accessing the web page, displays an access risk alert 506 on the web page in an overlaying manner, and intercepts the entire accessed web page. The access risk alert 506 includes a warning alert 506a for warning the user that the accessed web page has a security risk, URL information 506b of the accessed web page, a button 506c for closing the accessed web page, and a link 506d for continuing to access the accessed web page. If the user clicks the link 506d, the user continues to access the accessed web page.

Figure 6:
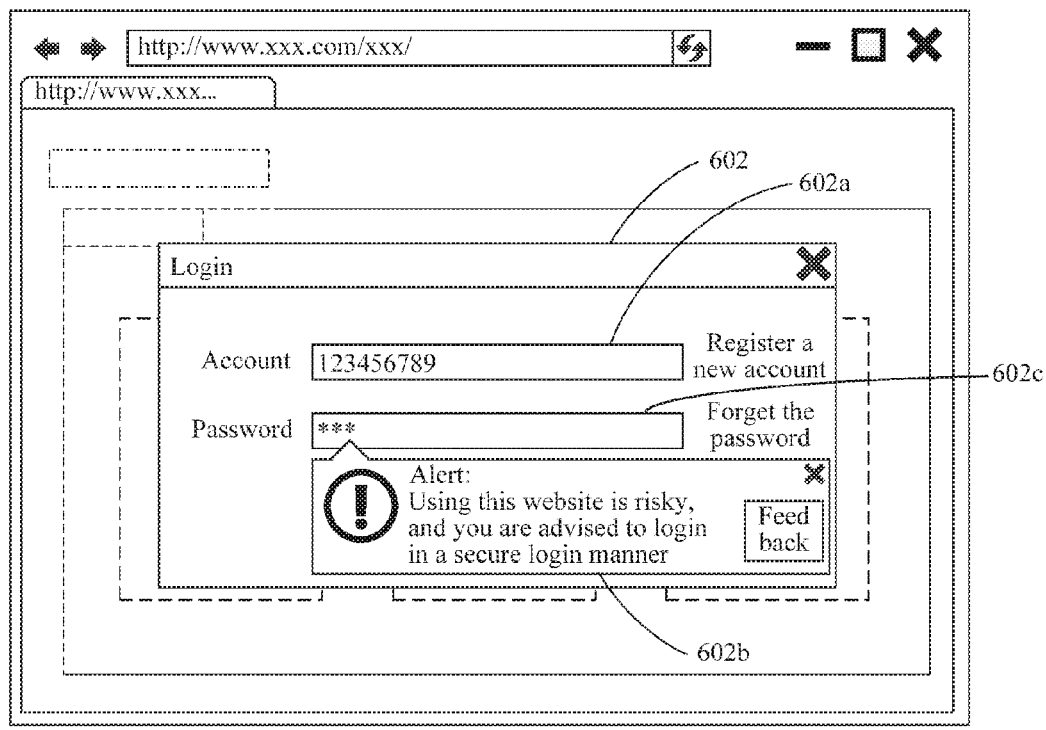
FIG. 6 is a schematic diagram of displaying an account security risk alert in a specific application scenario.

23) As shown in FIG. 6, when a login box 602 appears on the accessed web page, after the terminal detects that an account is inputted in an account input box 602a of the login box 602, the terminal detects an account input event. Then, the terminal determines whether the URL of the accessed web page is in a preset secure URL list, to detect whether the inputted URL is an official domain name. If the URL of the accessed web page is not in the preset secure URL list, the terminal performs page parsing and detection on the accessed web page, calculates a page similarity between the accessed web page and a preset real web page according to the URL of the accessed web page and/or web page content obtained through the parsing and detection, and then determines according to the page similarity whether the accessed web page has the security risk. If the security risk exists, the terminal intercepts the accessed web page, and displays an account security risk alert 602b, to warn the user to cautiously input a password in a password input box 602c and perform a login operation. In addition, the terminal performs a cloud report operation on the URL of the accessed web page and security risk information of the URL, to upload them to the server for storage.

24) If the user still chooses to input the account in the account input box 602a of the login box 602, the user inputs the password in the password input box 602c, and clicks a login button to log in; in this case the accessed web page submits a form that includes account information such as the account and the password. In this case, the terminal detects an operation of submitting the form that includes the password, determines according to the calculated page similarity that the accessed web page has the security risk, intercepts the submission operation, and displays a login security risk alert, so as to give a final alert to the user on the login operation.

It can be seen from the application scenario that, in a process from a user accessing a web page to the user logging in to the web page, risk alerts appear in multiple phases, which makes the user becomes very cautious when operating the web page, thereby greatly reducing a risk that a malicious web page cheats the user out of account information, and forcefully guaranteeing security of user account information.

Figure 7:
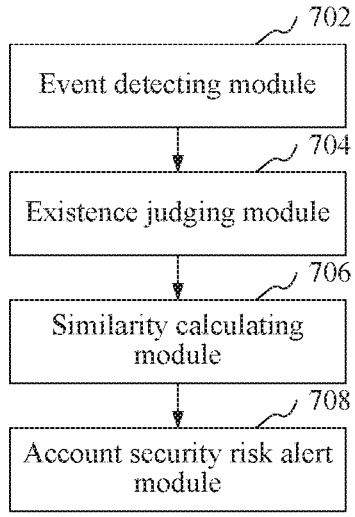
FIG. 7 is a structural block diagram of a system for security protection of account information in an embodiment.

As shown in FIG. 7, in an embodiment, a system for security protection of account information is provided, including an event detecting module 702, an existence judging module 704, a similarity calculating module 706, and an account security risk alert module 708.

The event detecting module 702 is configured to detect an account input event on an accessed web page.

The accessed web page refers to a web page that currently a user is accessing. The event detecting module 702 may be configured to detect the account input event by detecting content inputted in a password input box. Generally, an account has a specific format, for example, is a character string whose length exceeds a preset length value, consists of digits or letters, and generally does not include Chinese characters. Therefore, the event detecting module 702 may be configured to detect the account input event by detecting whether a character string in a preset format is inputted in the input box on the accessed web page.

The existence judging module 704 is configured to determine, when the account input event is detected, whether a URL of the accessed web page exists in a preset secure URL list.

When the existence judging module 704 detects the account input event, it indicates that the user performs a login operation, and the existence judging module 704 is configured to determine whether the accessed web page is secure. The preset secure URL list includes URLs of websites or web pages that are determined to be trusty, for example, an official website of a well-known company, and a web page thereof. The preset secure URL list may be obtained from a server and locally stored; or may be stored in a server, and pulled from the server when needed. The secure URL list does not necessarily need to be in the form of a table, but may also be text or be data stored in a predetermined format in a database. The URL of the accessed web page and the URLs in the preset secure URL list may be domain name addresses, or may be IP addresses.

The similarity calculating module 706 is configured to calculate, if the URL of the accessed web page does not exist in the secure URL list, a page similarity between the accessed web page and a preset real web page according to the URL and/or web page content of the accessed web page.

When the URL of the accessed web page is not in the preset secure URL list, it indicates that security of the accessed web page is unknown, and the similarity calculating module 706 is configured to measure the security of the accessed web page according to a similarity between the accessed web page and the preset real web page, where the preset real web page refers to a web page subject to counterfeiting. A higher similarity indicates a higher probability that the accessed web page is a malicious web page that counterfeits the preset real web page, and therefore indicates a lower security.

A URL and web page content of the preset real web page are objects subject to counterfeiting. Therefore, the page similarity between the accessed web page and the preset real web page may be calculated according to the URL and/or the web page content of the accessed web page, and furthermore the similarity between the accessed web page and the preset real web page may be measured. The page similarity between the accessed web page and the preset real web page may be calculated by detecting whether the character string in the URL and/or the web page content of the accessed web page includes a preset keyword, and according to a frequency of occurrence of the preset keyword. The web page content of the accessed web page may be obtained by using a DOM tree, where the DOM can access and modify content and a structure of a document in a platform- and language-independent manner.

In an embodiment, the similarity calculating module 706 may be configured to calculate the web page similarity according to an edit distance between the character string in the URL and/or the web page content of the accessed web page and the character string in the corresponding URL and/or the web page content of the preset real web page.

The account security risk alert module 708 is configured to determine, according to the page similarity, whether the accessed web page has a security risk, and if yes, display an account security risk alert.

Specifically, when the page similarity exceeds a similarity threshold, the account security risk alert module 708 may be configured to determine that the accessed web page has the security risk. In this case, the accessed web page is very similar to the preset real web page, and is very likely a web page formed by counterfeiting the real web page by a law breaker, and it may be determined that the accessed web page has the security risk. When the accessed web page has the security risk, by displaying the account security risk alert, the user may be warned that the accessed web page is untrustworthy, which makes the user cautiously perform an operation of inputting the account and password to log in. In addition, the account security risk alert module 708 may be further configured to display a guidance tip of guiding the user to perform a secure login operation, thereby improving security of accessing a web page.

The foregoing system for security protection of account information detects an account input event on an accessed web page first, and if the account input event is detected, determines whether a URL of the accessed web page exists in a preset secure URL list. If the URL of the accessed web page is not in the preset secure URL list, it indicates that the accessed web page may be a malicious website, and in this case it needs to further calculate a page similarity between the accessed web page and a preset real web page according to the URL and/or web page content of the accessed web page. The page similarity can measure a similarity between the accessed web page and the preset real web page. A higher page similarity indicates a higher similarity between the accessed web page and the preset real web page, and a higher security risk. Therefore, whether the accessed web page has a security risk may be determined according to the page similarity, and if the accessed web page has the security risk, a security risk alert is displayed, thereby preventing a user from being induced by a malicious website to input an account and a password, and achieving a purpose of security protection of user account information.

Figure 8:
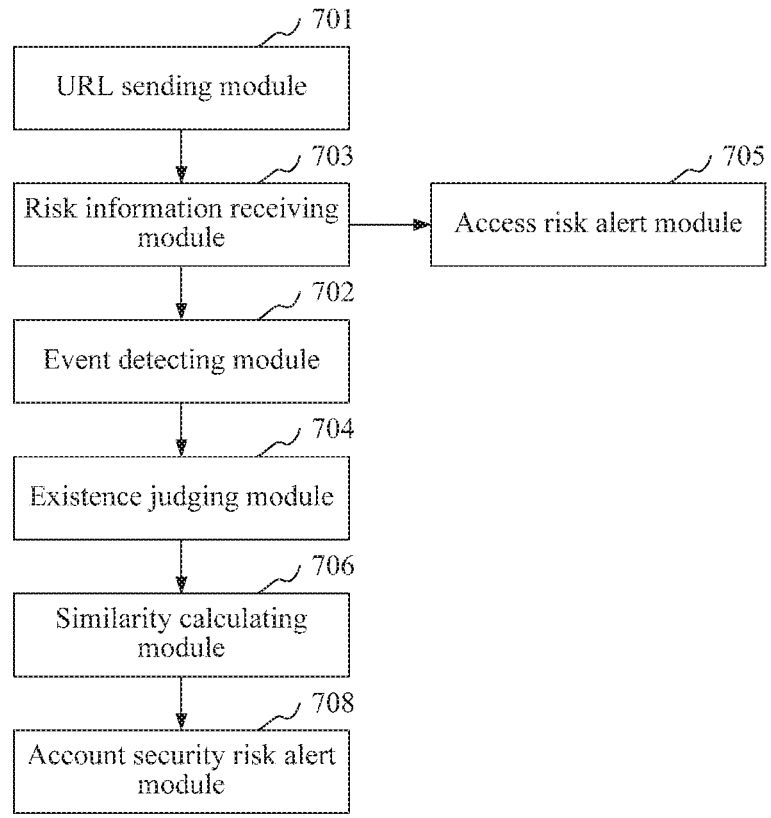
FIG. 8 is a structural block diagram of a system for security protection of account information in another embodiment.

As shown in FIG. 8, in an embodiment, the system for security protection of account information further includes a URL sending module 701 and a risk information receiving module 703.

The URL sending module 701 is configured to send the URL of the accessed web page to a server.

Specifically, the URL sending module 701 is configured to obtain an accessed URL in a web page browser, where the URL is the URL of the accessed web page, and sends the obtained URL to the server.

The risk information receiving module 703 is configured to receive risk information that is corresponding to the URL of the accessed web page and returned by the server.

The server is configured to return, after receiving the URL of the accessed web page, the risk information corresponding to the URL.

Specifically, in an embodiment, the risk information receiving module 703 is further configured to receive, after the server finds risk information that is corresponding to the URL of the accessed web page and in a preset URL database, the risk information returned by the server.

In this embodiment, the server is configured to preset a URL database, where the URL database includes a large number of URLs of known malicious web pages, and a correspondence between the URL and risk information is recorded in the URL database. The risk information indicates whether the web page corresponding to the URL is a malicious web page. In addition, the risk information may have levels, and the different levels indicate different risk degrees.

The server may be configured to establish and maintain the URL database by means of machine learning. Specifically, the server may be configured to discover and download web page content by using a web crawler tool. The server may be configured to capture threatening web page content by using the web crawler tool with preset different themes and in a preset scoring manner. The server may be configured to simulate the browser, and detect a feature code that the web page content has, so as to extract page information needed for discrimination of the security risk. For the extracted page information, the server is configured to scan and distinguish the web page content by means of word segmentation, a Bayes classifier, a similarity, keyword detection, and the like, to obtain the risk information, and finally obtain the correspondence between URL and the risk information, and add the correspondence to the URL database.

Further, when finding the URL of the accessed web page from the URL database, the server is configured to obtain the risk information that is corresponding to the URL of the accessed web page and in the preset URL database, and return the risk information.

In this embodiment, the server presets the URL database, and the server can update the URL database in real time, to keep malicious URLs included in the URL database as comprehensive as possible; in this way, when the server is searched for the risk information of the URL of the accessed web page, the server can return the risk information corresponding to the URL in time, thereby improving the processing efficiency.

In an embodiment, the risk information receiving module 703 is further configured to receive, when the server does not find risk information that is corresponding to the URL of the accessed web page and in a preset URL database, risk information that is generated according to the web page content of the accessed web page and then returned by the server.

Specifically, when the server does not find the risk information that is corresponding to the URL of the accessed web page and in the preset URL database, the server may be configured to obtain the web page content of the accessed web page, perform word segmentation on the obtained web page content, determine maliciousness of the accessed web page in at least one manner of the Bayes classifier, the similarity, and the keyword detection, generate the risk information according to the maliciousness, and return the generated risk information.

In this embodiment, after receiving the URL of the accessed web page, if the server does not find, in the preset URL database, the risk information corresponding to the URL of the accessed web page, the server may be configured to generate the risk information according to the web page content of the accessed web page, and return the risk information. In addition, the server may correspondingly store the URL of the accessed web page and the risk information in the URL database, so that other users can quickly obtain the risk information during a search, and accordingly determine the security risk for the accessed web page in time.

The event detecting module 702 is further configured to detect the account input event on the accessed web page when risk information indicating that the accessed web page is a non-malicious web page is received.

In an embodiment, the system for security protection of account information further includes an access risk alert module 705, configured to display an access risk alert when risk information indicating that the accessed web page is a malicious web page is received.

The access risk alert module 705 is configured to display the access risk alert when it is determined according to the received risk information that the accessed web page is a malicious web page. The access risk alert indicates a risk for accessing the accessed web page.

In an embodiment, the received risk information has levels; and the access risk alert module 705 is further configured to display an access risk alert corresponding to a level of the risk information.

In this embodiment, the different levels of the risk information indicate different risk degrees. Therefore, displaying an access risk alert corresponding to the level of the risk information may show the user a risk degree of the accessed web page, so that the user performs an appropriate and secure operation according to the risk degree, thereby improving security of accessing a web page.

In this embodiment, risk information of an accessed web page is obtained from a server, and thereby whether the accessed web page is a malicious web page is determined according to the received risk information. When it is determined that the accessed web page is a malicious web page, an access risk alert is directly displayed, to prevent a user from further accessing the accessed web page, which can protect security of user account information to a certain extent. When it is determined that the accessed web page is a non-malicious web page, in this case the accessed web page may be secure, and may also be a malicious web page that the server misses detecting and does not find. In this case, the foregoing operation of detecting an account input event on an accessed web page and its subsequent operations may be further performed, to prevent detection of a malicious web page from being missed.

Figure 9:
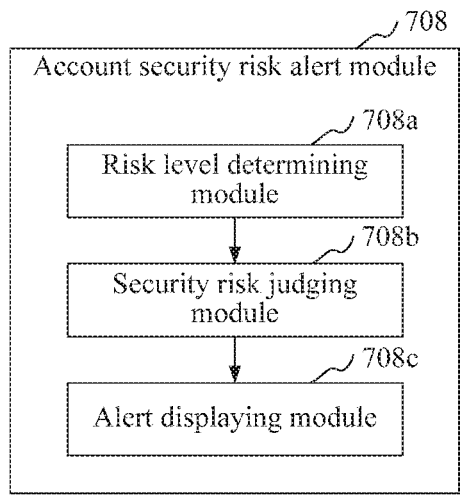
FIG. 9 is a structural block diagram of an account security risk alert module in an embodiment.

As shown in FIG. 9, in an embodiment, the account security risk alert module 708 includes a risk level determining module 708a, a security risk judging module 708b, and an alert displaying module 708c.

The risk level determining module 708a is configured to determine a risk level of the accessed web page according to the page similarity.

Specifically, the risk level determining module 708a may be configured to preset page similarity value ranges corresponding to different risk levels, and thereby configured to determine a risk level of the accessed web page according to a similarity value range that the page similarity obtained through calculation is in.

The security risk judging module 708b is configured to determine, according to the risk level, whether the accessed web page has a security risk.

Specifically, the risk levels may include four levels, which are "malicious", "high risk", "low risk", and "secure", where the levels "malicious", "high risk", and "low risk" indicate that the accessed web page has the security risk, while the level "secure" indicates that the accessed web page does not have the security risk. Different operations are separately performed according to results of determining whether the accessed web page has a security risk.

The alert displaying module 708c is configured to display an account security risk alert corresponding to the risk level when the accessed web page has the security risk.

The risk level indicates whether the accessed web page has a security risk, and a degree of the security risk, and the account security risk alert indicates whether a user account has a security risk, and a degree of the security risk.

In this embodiment, a risk level of an accessed web page is determined according to a page similarity between the accessed web page and a preset real web page, and thereby account security risk alerts corresponding to different risk levels are displayed, and a risk degree of the accessed web page can be intuitively shown to a user, so that the user performs an appropriate and secure operation according to the risk degree of the accessed web page, thereby improving security of accessing a web page.

Figure 10:
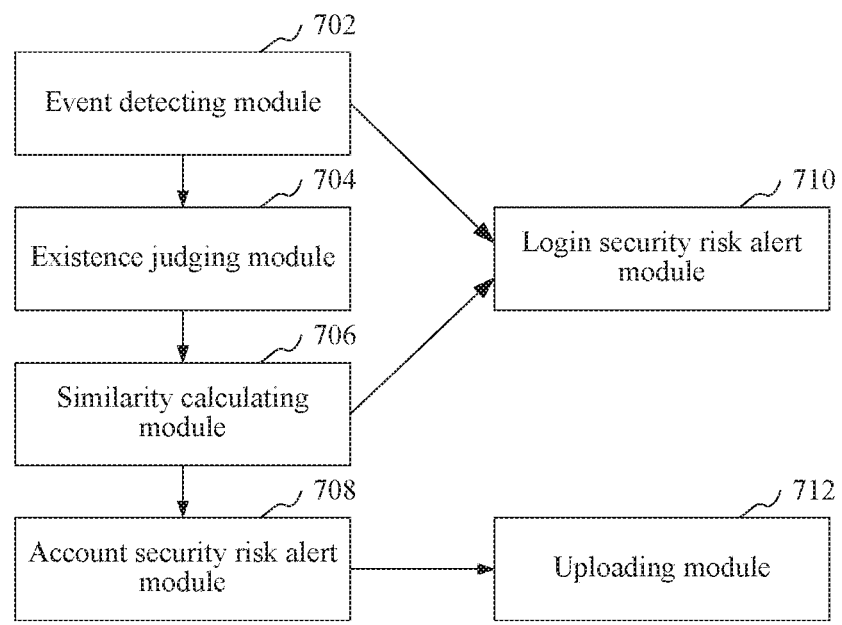
FIG. 10 is a structural block diagram of a system for security protection of account information in still another embodiment.

As shown in FIG. 10, in an embodiment, the event detecting module 702 is further configured to detect a password submission event on an accessed web page.

The system further includes a login security risk alert module 710, configured to display a login security risk alert when the password submission event is detected, and when it is determined according to a page similarity that the accessed web page has the security risk.

Submission of a password is a necessary process for login, and the event detecting module 702 is configured to detect whether there is a login operation by detecting the password submission event. Specifically, the event detecting module 702 may be configured to detect the password submission event by detecting submission of a form that includes the password. The event detecting module 702 may be configured to determine whether the form includes the password by detecting whether a password identifier (for example, "password") exists in the form, so as to detect the password submission event on the accessed web page.

When the password submission event is detected, and it is determined according to a page similarity that an accessed web page has a security risk, the login security risk alert module 710 is configured to display a login security risk alert to a user, and before the user performs a final login operation, give a final warning to the user, to prevent account information disclosure.

In this embodiment, after a password is submitted, account information disclosure cannot be controlled, and therefore detecting a password submission event is a last guarantee for preventing the password disclosure. When the password submission event is detected, and it is determined according to a page similarity that an accessed web page has a security risk, a login security risk alert is displayed to a user, and before the user performs a final login operation, the user is given a final warning, thereby preventing account information disclosure, so as to guarantee the security of user account information.

In an embodiment, the login security risk alert module 710 is further configured to: when the password submission event is detected, and when a risk level of the accessed web page determined according to the page similarity indicates that the accessed web page has the security risk, display the login security risk alert corresponding to the risk level.

In this embodiment, a risk level of an accessed web page may be determined according to a page similarity, and thereby a login security risk alert module 710 is configured to: when displaying a login security risk alert, display the login security risk alert corresponding to the risk level. The risk level may indicate whether the accessed web page has a security risk, and a degree of the security risk, and the account security risk alert may indicate whether a user account has a security risk, and a degree of the security risk. Displaying the account security risk alert corresponding to the risk level can intuitively show the user the risk degree of the accessed web page, so that the user performs an appropriate and secure operation according to the risk degree of the accessed web page, thereby improving security of accessing a web page.

In an embodiment, the system for security protection of account information further includes: an uploading module 712, configured to correspondingly upload a URL of an accessed web page having a security risk, and security risk information to a server.

The security risk information includes information about whether the accessed web page has the security risk, which is determined according to a page similarity, and preferably may include information about a risk level of the accessed web page determined according to the page similarity.

In this embodiment, the uploading module 712 is configured to correspondingly upload a URL of an accessed web page having a security risk, and security risk information to a server, so that the server stores a correspondence between the URL of the accessed web page and the security risk information, and specifically the server may be configured to store the correspondence in a preset URL database. When accessing the accessed web page, a user may directly obtain the security risk information from the server, which implements sharing of the security risk information, and thereby may guarantee security of account information of a large number of users.

In an embodiment, the web page content of the accessed web page includes at least one of a web page title, text information before the input box, and web page copyright information.

In this embodiment, the web page content such as the web page title, the text information before the input box, and the web page copyright information is representative, and can reflect whether an owner of the accessed web page has an attempt to counterfeit a real web page. Therefore, it may be unnecessary to use all of the web page content of the accessed web page to calculate the page similarity, which can reduce calculation complexity.

Figure 11:
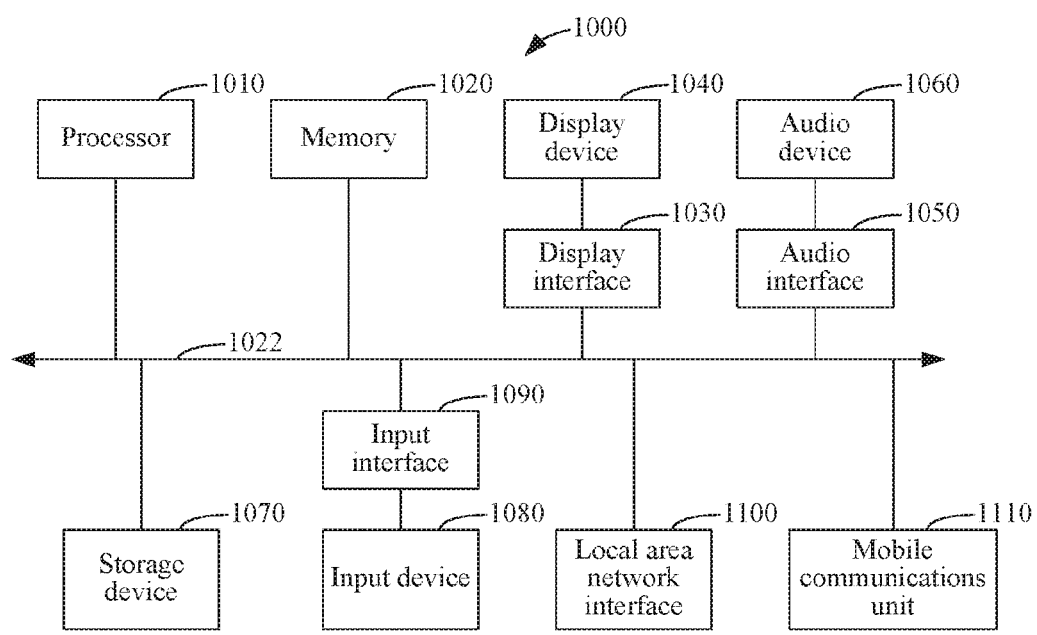
FIG. 11 is a block diagram of a computer system that can implement embodiments of the present invention in an embodiment.

FIG. 11 is a block diagram of a computer system 1000 that can implement the embodiments of the present invention. The computer system 1000 is merely an example of computer environments applicable to the present disclosure, and should not be construed as any limitation on the application scope of the present disclosure. The computer system 1000 also should not be interpreted as needing to rely on or have one or a combination of parts of the exemplary computer system 1000 shown in FIG. 11.

The computer system 1000 shown in FIG. 11 is an example of computer systems suitable for use in the present disclosure. Other architectures having different subsystem configurations may also be used. For example, well-known devices such as a desktop computer, a notebook computer, a personal digital assistant, a smart phone, a tablet computer, a portable media player are applicable to some embodiments of the present invention, but the present disclosure is not limited thereto.

As shown in FIG. 11, the computer system 1000 includes a processor 1010, a memory 1020 and a system bus 1022. Various system components including the memory 1020 and the processor 1010 are connected to the system bus 1022. The processor 1010 is hardware for executing computer program instructions by means of basic arithmetic and logic operations in the computer system. The memory 1020 is a physical device for temporarily or permanently storing computer programs or data (for example, program state information). The system bus 1022 may be any one of the following types of bus structures: a memory bus or memory controller, a peripheral bus and a local bus. The processor 1010 and the memory 1020 can perform data communication through the system bus 1022. The memory 1020 includes a read-only memory (ROM) or a flash memory (both not shown), and a random access memory (RAM), where the RAM generally refers to main memory loaded with an operating system and application programs.

The computer system 1000 further includes a display interface 1030 (for example, a graphics processing unit), a display device 1040 (for example, a liquid crystal display), an audio interface 1050 (for example, a sound card) and an audio device 1060 (for example, a loudspeaker). The display device 1040 and the audio device 1060 are media devices for presenting multimedia content.

The computer system 1000 generally includes one storage device 1070. The storage device 1070 may be selected from multiple types of computer readable media. The computer readable media refer to any available media that can be accessed by the computer system 1000, and include removable media and non-removable media. For example, the computer readable media include, but not limited to, a flash memory (micro SD card), a CD-ROM, a digital versatile disc (DVD) or other optical storage, a cassette, a magnetic tape, a disk storage or other magnetic storage devices, or any other media that can be used to store required information and can be accessed by the computer system 1000.

The computer system 1000 further includes an input device 1080 and an input interface 1090 (for example, an IO controller). A user may input an instruction and information into the computer system 1000 by using the input device 1080, such as a keyboard, a mouse or a touch panel device on the display device 1040. The input device 1080 is generally connected to the system bus 1022 through the input interface 1090, but may also be connected through other interfaces or bus structures, such as a universal serial bus (USB).

The computer system 1000 may be logically connected to one or more network devices in a network environment. The network device may be a personal computer, a server, a router, a smart phone, a tablet computer or other public network nodes. The computer system 1000 is connected to the network device through a local area network (LAN) interface 1100 or a mobile communications unit 1110. A local area network (LAN) refers to an interconnected computer network in a limited area such as a family, a school, a computer laboratory, or an office building using network media. WiFi and Ethernet over twisted pair are the most commonly used two technologies for building a local area network. WiFi is a technology that enables the computer systems 1000 to exchange data or to be connected to a wireless network through radio waves. The mobile communications unit 1110 is capable of making and receiving calls through radio communications lines while moving in a broad geographic area. In addition to calling, the mobile communications unit 1110 also supports Internet access in a 2G, 3G or 4G cellular communications system that provides mobile data services.

It should be noted that other computer systems including more or fewer subsystems than those of the computer system 1000 are also applicable to the present disclosure. For example, the computer system 1000 may include a Bluetooth unit capable of exchanging data in a short distance, an image sensor for capturing images, and an accelerometer for measuring the acceleration.

As described above in detail, the computer system 1000 applicable to the present disclosure can execute specified operations in the method for security protection of account information. The computer system 1000 executes these operations in the form of running software instructions in the computer readable media by the processor 1010. These software instructions may be read into the memory 1020 from the storage device 1070 or from another device through the local area network interface 1100. The software instructions stored in the memory 1020 enable the processor 1010 to execute the method for security protection of account information. Moreover, the present disclosure may also be implemented by using a hardware circuit or by using a combination of a hardware circuit and software instructions. Therefore, the implementation of the present disclosure is not limited to any particular combination of a hardware circuit and software.

The foregoing embodiments only describe several implementation manners of the present disclosure, and their description is specific and detailed, but cannot therefore be understood as a limitation to the patent scope of the present disclosure. It should be noted that, a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A method for security protection of account information, performed at a terminal computer having one or more processors and one or more memories for storing programs to be executed by the one or more processors, the method comprising:

detecting an account input event on an accessed web page;

determining, when the account input event is detected, whether a Uniform Resource Locator (URL) of the accessed web page exists in a preset secure URL list;

calculating, if the URL of the accessed web page does not exist in the secure URL list, a page similarity between the accessed web page and a preset real web page according to both the URL and web page content of the accessed web page; and determining, according to the page similarity on both the URL and web page content, whether the accessed web page has a security risk, and if yes, displaying an account security risk alert;

wherein the calculating of the page similarity between the accessed web page and the preset real web page according to both the URL and web page content of the accessed web page comprises:
  detecting whether both the character string in the URL and the web page content of the accessed web page include a preset keyword, and a frequency of occurrence of the preset keyword, and
  determining whether both the page similarity according to the preset keyword and the frequency of occurrence of the preset keyword has a security risk, and if yes, displaying an account security risk alert corresponding to a security risk level,
wherein the account input event further comprises:
  detecting a password submission event on the accessed web page; and
  when it is determined according to the page similarity that the accessed web page has a security risk, displaying a login security risk alert.

2. The method according to claim 1, wherein before the detecting an account input event on an accessed web page, the method further comprises:
  sending the URL of the accessed web page to a server;
  receiving risk information that is corresponding to the URL of the accessed web page and returned by the server; and
  wherein when risk information indicating that the accessed web page is a nonmalicious web page is received, the step of detecting an account input event on an accessed web page is performed.

3. The method according to claim 2, wherein the receiving risk information that is corresponding to the URL of the accessed web page and returned by the server comprises:
  receiving, after the server finds risk information that is corresponding to the URL of the accessed web page and in a preset URL database, the risk information returned by the server; or,
  receiving, when the server does not find risk information that is corresponding to the URL of the accessed web page and in a preset URL database, risk information that is generated according to the web page content of the accessed web page and then returned by the server.

4. The method according to claim 2, further comprising:
  displaying an access risk alert when risk information indicating that the accessed web page is a malicious web page is received.

5. The method according to claim 1, further comprising:
  correspondingly uploading the URL of the accessed web page having the security risk, and security risk information to a server.

6. A system for security protection of account information, performed at a terminal computer having one or more processors and one or more memories for storing programs to be executed by the one or more processors, wherein the system comprising:
  an event detecting module, configured to detect an account input event on an accessed web page;
  an existence judging module, configured to determine, when the account input event is detected, whether a Uniform Resource Locator (URL) of the accessed web page exists in a preset secure URL list;
  a similarity calculating module, configured to calculate, if the URL of the accessed web page does not exist in the secure URL list, a page similarity between the accessed web page and a preset real web page according to both the URL and/or web page content of the accessed web page; and
  an account security risk alert module, configured to determine, according to the page similarity on both the URL and web page content, whether the accessed web page has a security risk, and if yes, display an account security risk alert;
  wherein the similarity calculating module is configured to realize calculating the page similarity between the accessed web page and the preset real web page according to both the URL and/or web page content of the accessed web page by the following step:
  detecting whether both the character string in the URL and the web page content of the accessed web page includes a preset keyword, and a frequency of occurrence of the preset keyword, and
  determining the page similarity according to the preset keyword and the frequency of occurrence of the preset keyword;
  wherein the event detecting module is further configured to detect a password submission event on the accessed web page; and
  the system further comprises a login security risk alert module, when it is determined according to the page similarity that the accessed web page has a security risk, configured to display a login security risk alert.

7. The system according to claim 6, wherein the system further comprises a URL sending module and a risk information receiving module,
  wherein the URL sending module is configured to send the URL of the accessed web page to a server;
  the risk information receiving module is configured to receive risk information that is corresponding to the URL of the accessed web page and returned by the server; and the event detecting module is further configured to detect the account input event on the accessed web page when risk information indicating that the accessed web page is a non-malicious web page is received.

8. The system according to claim 7, wherein the risk information receiving module is further configured to receive, after the server finds risk information that is corresponding to the URL of the accessed web page and in a preset URL database, the risk information returned by the server; or
  the risk information receiving module is further configured to receive, when the server does not find risk information that is corresponding to the URL of the accessed web page and in a preset URL database, risk information that is generated according to the web page content of the accessed web page and then returned by the server.

9. The system according to claim 7, further comprising:
  an access risk alert module, configured to display an access risk alert when risk information indicating that the accessed web page is a malicious web page is received.

10. The system according to claim 6, wherein the system further comprises:
  an uploading module, configured to correspondingly upload the URL of the accessed web page having the security risk, and security risk information to a server.

* * * * *